US012039481B2

(12) United States Patent
Zou et al.

(10) Patent No.: US 12,039,481 B2
(45) Date of Patent: Jul. 16, 2024

(54) INTERACTIVE TEST METHOD, DEVICE AND SYSTEM

(71) Applicant: BOE TECHNOLOGY GROUP CO., LTD., Beijing (CN)

(72) Inventors: Xiangxiang Zou, Beijing (CN); Bin Shen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1308 days.

(21) Appl. No.: 16/441,780

(22) Filed: Jun. 14, 2019

(65) Prior Publication Data

US 2020/0143151 A1    May 7, 2020

(30) Foreign Application Priority Data

Nov. 1, 2018   (CN) .......................... 201811296144.0

(51) Int. Cl.
*G06F 3/048*    (2013.01)
*G01N 35/00*    (2006.01)
(Continued)

(52) U.S. Cl.
CPC ... *G06Q 10/06395* (2013.01); *G01N 35/0099* (2013.01); *G06F 3/01* (2013.01);
(Continued)

(58) Field of Classification Search
CPC .. G06V 40/20; G06V 10/945; G06V 2201/06; G01N 35/0099;
(Continued)

(56) References Cited

U.S. PATENT DOCUMENTS 9,434,072 B2 *  9/2016  Buehler ............... G05B 19/423
9,798,314 B2 * 10/2017  Dougherty ....... G05B 19/41875
(Continued)

FOREIGN PATENT DOCUMENTS

CN       106885594 A     6/2017
CN       107422856 A    12/2017
(Continued)

OTHER PUBLICATIONS

Chinese Office Action in Chinese Application No. 201811296144.0 dated Nov. 29, 2021 with English translation.

Primary Examiner — Mohamed Abou El Seoud
(74) Attorney, Agent, or Firm — Collard & Roe, P.C.

(57) ABSTRACT

An interactive test method, device and system are disclosed. An interactive test method, applicable to a product to be tested, including: obtaining an identification of the product to be tested; obtaining test conditions corresponding to the product to be tested according to the identification, wherein the test conditions include a test type, a test location, a test case and the attribute information of the test case; transmitting a first instruction including the test location to an actuating device; transmitting a second instruction including the test case and the attribute information of the test case to a test device; and obtaining test data transmitted by the test device and obtained by performing a test according to the first instruction and the second instruction, and comparing the test data with the test case to obtain a test result.

12 Claims, 6 Drawing Sheets

(51) Int. Cl.
  *G06F 3/01* (2006.01)
  *G06F 11/263* (2006.01)
  *G06F 11/36* (2006.01)
  *G06F 40/279* (2020.01)
  *G06Q 10/0639* (2023.01)
  *G06V 10/94* (2022.01)
  *G10L 15/01* (2013.01)
  *G10L 15/02* (2006.01)
  *G10L 15/26* (2006.01)
  *G01N 35/04* (2006.01)
  *G06V 40/20* (2022.01)

(52) U.S. Cl.
  CPC ............ *G06F 3/017* (2013.01); *G06F 11/263* (2013.01); *G06F 11/3692* (2013.01); *G06F 40/279* (2020.01); *G06V 10/945* (2022.01); *G10L 15/01* (2013.01); *G10L 15/02* (2013.01); *G10L 15/26* (2013.01); *G01N 2035/0424* (2013.01); *G01N 2035/0439* (2013.01); *G06V 40/20* (2022.01)

(58) Field of Classification Search
  CPC .... G01N 2035/0424; G01N 2035/0439; G06F 3/01; G06F 3/017; G06F 11/263; G06F 11/3692; G06F 40/279; G06F 11/3684; G06F 11/3688; G10L 15/01; G10L 15/02; G10L 15/26; G10L 13/00; G06Q 10/06395; Y02P 90/30
  See application file for complete search history.

(56) References Cited

U.S. PATENT DOCUMENTS

| | | | |
|---|---|---|---|
| 2004/0181713 | A1 | 9/2004 | Lambert |
| 2010/0295773 | A1* | 11/2010 | Alameh ................ G06F 3/0304 715/863 |
| 2015/0057961 | A1* | 2/2015 | Montoya ............ G06F 11/2294 702/121 |
| 2019/0011992 | A1 | 1/2019 | Zhao et al. |
| 2019/0240831 | A1* | 8/2019 | Bonora ................ B25J 11/0095 |
| 2019/0294535 | A1* | 9/2019 | Allen ................ G06F 11/3664 |

FOREIGN PATENT DOCUMENTS

| | | | | |
|---|---|---|---|---|
| CN | 108228468 A | | 6/2018 | |
| CN | 108646918 A | | 10/2018 | |
| CN | 107039050 B | * | 12/2020 | ........... G06F 40/279 |
| EP | 3070645 A1 | * | 9/2016 | ............... G06F 3/01 |

* cited by examiner

INTERACTIVE TEST METHOD, DEVICE AND SYSTEM

CROSS-REFERENCE TO RELATED APPLICATION

The present application claims priority of Chinese Patent Application No. 201811296144.0, filed on Nov. 1, 2018, the disclosure of which is incorporated herein by reference in its entirety as part of the present application.

TECHNICAL FIELD

The embodiments of the present disclosure relate to an interactive test method, device and system.

BACKGROUND

Interactive test methods in most cases mainly rely on test staffs to perform a manual test. For example, a test staff dictates a test case or makes a gesture while standing in a test location. The test data is obtained by a product to be tested that is placed on a test-board, and then the test staff manually compare the test data and the test case to obtain a test result.

SUMMARY

At least an embodiment of the present disclosure discloses an interactive test method, applicable to a product to be tested. The interactive test method comprises obtaining an identification of the product to be tested; obtaining test conditions corresponding to the product to be tested according to the identification, wherein the test conditions comprise a test type, a test location, a test case and attribute information of the test case; transmitting a first instruction comprising the test location to an actuating device; transmitting a second instruction comprising the test case and the attribute information of the test case to a test device; obtaining test data transmitted by the test device and obtained by performing a test according to the first instruction and the second instruction, and comparing the test data with the test case to obtain a test result.

At least an embodiment of the present disclosure discloses an interactive test device, applicable to a product to be tested. The interactive test device comprises an acquisition module, for obtaining an identification of the product to be tested; a query module, for obtaining test conditions corresponding to the product to be tested according to the identification, wherein the test conditions comprise a test type, a test location, a test case and attribute information of the test case; a transmission module, for transmitting a first instruction comprising the test location to an actuating device, and transmitting a second instruction comprising the test case and the attribute information of the test case to a test device; a detection comparison module, for obtaining the test data transmitted by the test device and obtained by performing a test according to the first instruction and the second instruction, and comparing the test data with the test case, to obtain a test result.

At least an embodiment of the present disclosure discloses an interactive test system. The interactive test system comprises an actuating device, for moving to a test location according to a first instruction, which comprises the test location of a product to be tested; and a test device, for executing a test case based on the attribute information according to a second instruction comprising the test case of the product to be tested and the attribute information of the test case.

At least an embodiment of the present disclosure discloses an interactive test method, applicable to a product to be tested. The interactive test method comprises obtaining an identification of the product to be tested; obtaining test conditions corresponding to the product to be tested according to the identification, wherein the test conditions comprise a test type, a test location, a test case and attribute information of the test case; transmitting the test conditions to an actuating device for driving the actuating device to the test location; transmitting a test case and attribute information of the test case to a test device, to allows the test device to execute the test case based on the attribute information; obtaining test data transmitted by the test device, and comparing the test data with the test case to obtain a test result.

At least an embodiment of the present disclosure discloses an interactive test device, applicable to a product to be tested placed on a test-broad. The interactive test device comprises an acquisition module configured for obtaining an identification of the product to be tested; a query module configured for obtaining test conditions corresponding to the product to be tested according to the identification, wherein the test conditions comprise a test type, a test location, a test case and attribute information of the test case; a transmission module, configured for transmitting the test conditions to an actuating device to drive the actuating device to the test location, and for transmitting a test case and attribute information of the test case to a test device, to allow the test device to execute the test case based on the attribute information; a detection comparison module, configured for obtaining test data transmitted by the test device and comparing the test data with the test case to obtain a test result.

For example, the acquisition module is further used to obtain a test type of the product to be test. When the test type of the product to be tested is speech interaction, the test case is text content, and the attribute information of the test case comprises any or more of pronunciation, speaking speed, volume, intonation, dialect type, so that the test device synthesize speech on the text content based on the attribute information of the test case, and play the synthesized voice signal out. The detection comparison module is further used to receive the voice signal played by the test device, to conduct speech recognition on the voice signal to obtain the recognized content, and to compare the recognized content with the test case to determine whether the recognized content is correct.

For example, when the test type of the product to be tested is gesture interaction, the test case is gesture content, and the attribute information of the test case comprises any one or more of movement frequency and gesture amplitude. The test device makes corresponding gestures according to the gesture content and the attribute information of the test case. The detection comparison module is used for capturing and obtaining gesture images of the test device, conducting image recognition on the gesture images to obtain a recognized gesture, and comparing the recognition gesture with the gesture content to determine whether the recognition gesture is right.

For example, the device further comprises a generation module, for generating a test report according to the test result, wherein the test report comprises the test result, the test time, the test position, the test case and the test data.

For example, the device further comprises a determining module and a prompting module. The determination module is used for determining whether the test is successful according to the test result. The prompt module is used for transmitting a first prompt information when the test is successful, and for transmitting a second prompt information when the test is unsuccessful.

At least an embodiment of the present disclosure discloses an interactive test device. The interactive test device comprises a memory, a processor, and a computer program stored on the memory and capable of causing the processor to execute the interactive test method described above when the program is executed by the processor.

At least an embodiment of the present disclosure discloses a non-volatile computer readable storage medium, on which a computer program is stored, and, when executed by a processor, causes the processor to execute the interactive test method described above.

Additional aspects and advantages of present disclosure will be set forth in part in the description which follows, and in part will be apparent from the description, or may be learned by practice of the disclosure.

BRIEF DESCRIPTION OF THE DRAWINGS

In order to explain the technical scheme of embodiments of the present disclosure more clearly, drawings of the embodiments are briefly introduced. It is obvious that the drawings in the following description only involve in some of embodiments of present disclosure, not to limit present disclosure.

DETAILED DESCRIPTION

Figure 1:
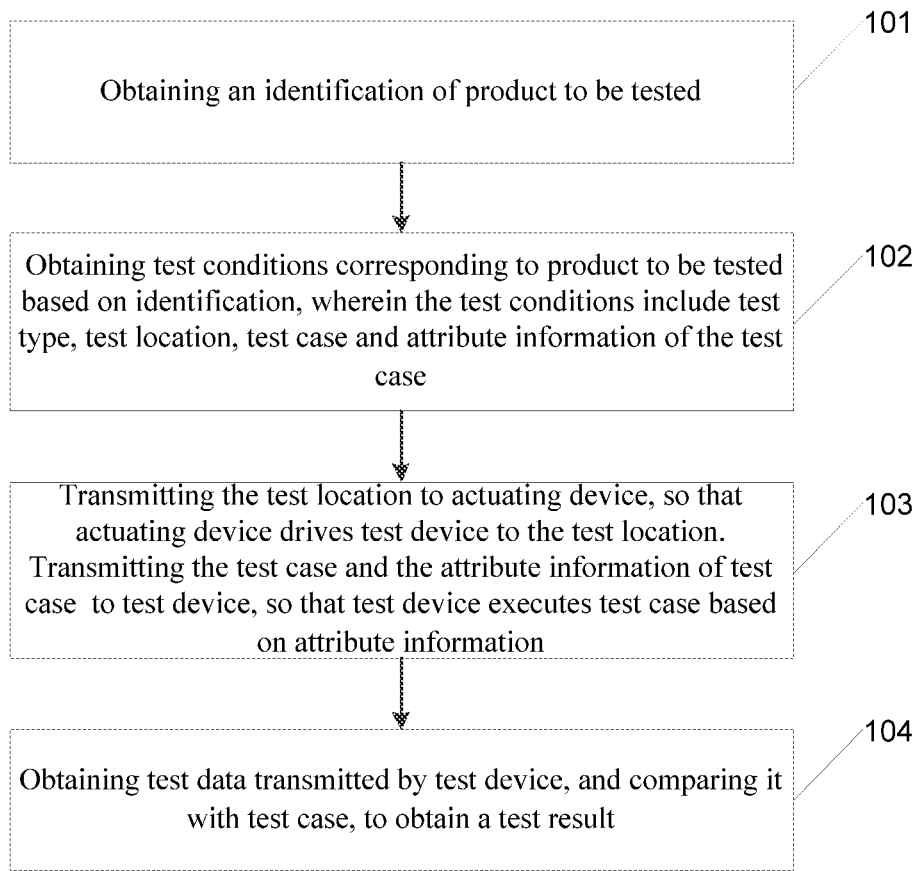
FIG. 1 is a schematic flowchart illustrating an interactive test method provided by at least an embodiment of the present disclosure.

Embodiments of the present disclosure are described in detail below, examples of which are illustrated in the accompanying drawings, wherein the same or like reference numerals refer to the same or like elements or elements having the same or like functions throughout. The embodiments described below with reference to the accompanying drawings are exemplary and are intended to explain the present disclosure and should not be construed as limiting the disclosure.

Interactive test methods in usual cases mainly rely on test staffs to perform a manual test. However, due to the difference in different test staffs' accents, volume of voices, speaking speeds, given gestures, amplitude of gestures, etc., which are quite different from standard voices and standard gestures, the accuracy and consistency of test data may be affected by performing an interactive test with those interactive test methods. Furthermore, due to the manual comparison between test data and test cases by test staffs, test results are error-prone, which may further reduce the accuracy of test results. Moreover, such interactive test method may also have drawbacks of high labor cost, long test time and the like.

An interactive test method, device, and system of at least an embodiment of the present disclosure will be described below with reference to the accompanying drawings.

FIG. 1 is a schematic flowchart illustrating an interactive test method provided by at least an embodiment of the present disclosure. As shown in FIG. 1, an interactive test method is applicable to a product to be tested that is placed on a test-board. The interactive test method mainly comprises the following steps S101 to S104.

Step S101: obtaining an identification of a product to be tested.

The operation device of the interactive test method provided by at least an embodiment of the present disclosure may be an interactive test device. For example, the interactive test device may be a product to be tested, or a software installed on a product to be tested. In present embodiment, the operation device which is a product to be tested is taken as an example for explanation. Where, the product to be tested may be, for example, a smart player, a smart water-heater, a smart TV, a game device related to gestures, etc. The identification of the product to be tested may be, for example, name, serial-number or the like of the product to be tested, which are capable of identifying the uniqueness of the product to be tested.

Step S102: obtaining test conditions corresponding to the product to be tested according to the identification, wherein the test conditions comprise a test type, a test location, a test case and attribute information of the test case.

According to at least an embodiment of the present disclosure, test conditions corresponding to a product to be tested may be pre-stored in the product to be tested. Thus, the product to be tested may be able to obtain the test conditions directly from a memory or the like. According to at least an embodiment of the present disclosure, test conditions may be used for conducting testing for the product to be tested. For example, when the product to be tested is a speech-interactive product, test conditions may be used to test the accuracy of speech recognition, abilities of obtaining speech signal or the like for the speech-interactive product. In another embodiment, test conditions corresponding to a product to be tested may be pre-stored in a server accessible by the product to be tested. Prior to the test, the product to be tested may access the server in wireless or wired manner, and download corresponding test conditions for testing.

According to at least an embodiment of the present disclosure, the test location may comprise a test distance and a test angle. The test case may be text content, voice signal, gesture content, or the like. The attribute information of the test case may be, for example, pronunciation, speaking speed, volume, intonation, language type, dialect type, gesture moving frequency, gesture amplitude, etc. The dialect type may be such as Cantonese, Beijing dialect, Shanghainese, etc., while the language type may comprise Chinese, English, Japanese, etc.

Step S103: transmitting a first instruction comprising the test location to an actuating device; and transmitting a second instruction comprising a test case and the attribute information of the test case to a test device.

For example, the first instruction instructs the actuating device to drive the test device to the test location, and the second instruction instructs the test device to execute the test case based on the attribute information.

According to at least an embodiment of the present disclosure, a product to be tested may be applicable to an interactive test system. An interactive test system may comprise a test-board for placement of a product to be tested, an actuating device, and a test device fixedly connected to the actuating device. The actuating device may be coupled to the product to be tested, for moving to a test location according to a first instruction of the product to be tested. The test device may further be coupled to the product to be tested, for executing a corresponding test case based on the attribute information according to a second instruction of the product to be tested. The product to be tested can perform the interactive test method shown in FIG. 1. The actuating device may be a robot or other device that can move automatically, or a mobile device that can move in conjunction with a test track. For example, the actuating device may comprise stepping motor, lead-screw, wheel travelling device, caterpillar-track travelling device or the like. For another example, the actuating device may further comprise position limiting devices (e.g., a limit stop, a relay) or other devices which could drive a test device to a predetermined test location.

Figure 2:
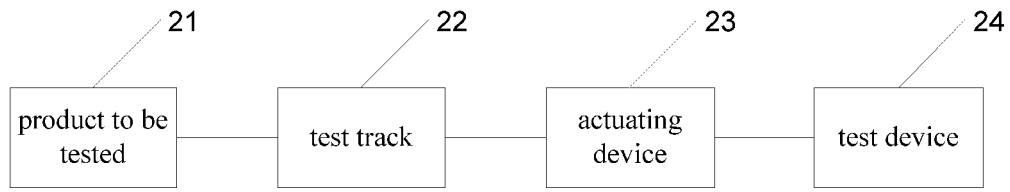
FIG. 2 is a schematic diagram illustrating an interactive test system.

According to at least an embodiment of the present disclosure, a schematic diagram of an interactive test system could be shown in FIG. 2 when an actuating device is coordinated with the test track to move according to the first instruction. The interactive test system may comprise a test-board for placement of a product 21 to be tested, a test track 22, an actuating device 23 placed on the test track 22, and a test device 24 fixedly connected to the actuating device 23. The actuating device 23 may be coupled to the product 21 to be tested through signal transmission for communication, for moving to the test location along the test track according to a first instruction of the product to be tested. The test device 24 may be coupled to the product 21 to be tested through signal transmission for communication, for execution of corresponding test case based on the attribute information according to a second instruction of the product to be tested. The product 21 to be tested may obtain the test data transmitted by the test device, and compare the test data with the test case, for obtaining a test result.

According to at least an embodiment of the present disclosure, after transmitting of a first instruction comprising a test location to an actuating device by a product to be tested, the actuating device may move to the test location along a test track, for taking a test device fixed to the actuating device to move to the test location. After the actuating device has moved to the test location, the actuating device may transmit a response message to the product to be tested. After receiving the response message, the product to be tested may transmit a test case and attribute information of the test case to a test device, and the test device may execute the test case based on the attribute information.

Step S104: obtaining the test data transmitted by the test device, and comparing the test data with the test case, for obtaining a test result.

The method according to at least an embodiment of the present disclosure may further comprise the following steps: a test type of the product to be tested is obtained. When the test type of the product to be tested is speech interaction, the test case is text content, and the attribute information of the test case comprises any one or more of pronunciation, speaking speed, volume, intonation, language type, dialect type. Thus, the test device can synthesize a speech on the text content based on the attribute information, and play the synthesized voice signal.

Figure 3:
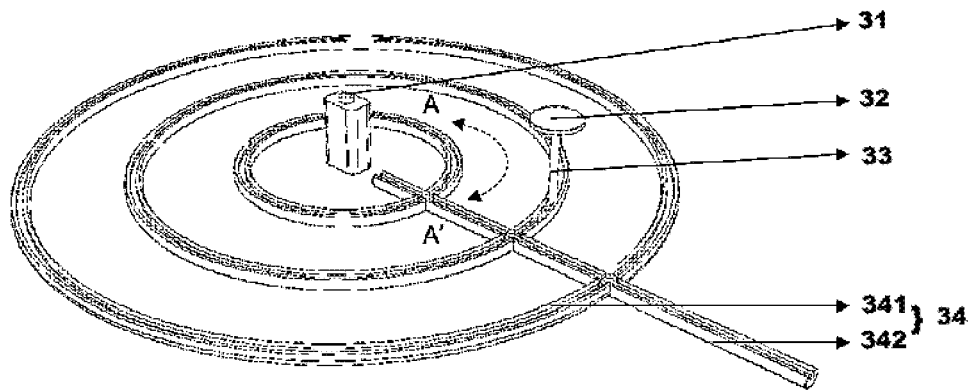
FIG. 3 is a schematic diagram of an interactive test system when the test type of a product to be tested is speech interaction.

FIG. 3 is a schematic diagram of an interactive test system when the test type of the product to be tested is speech interaction.

As shown in FIG. 3, the interactive test system may comprise a test-board 31 for placement of a product to be tested, a speech interactive test device 32, an actuating device 33, and a test track 34. Where, the test track 34 comprises a first test track 341 with a center of a circle at a test-board 31. A second test track 342 coincides with a connecting line between the center of the circle and a point outside the first test track 341, that is, the second test track 342 can be obtained by connecting the center of the circle with a point outside the first test track 341. In FIG. 3, the first test track 341 has three circular tracks. The second test track 342 is joined to the three circular tracks of the first test track 341. The actuating device 33 may move all around the three circular tracks of the first test track 341 (for example, in the direction of A-A'), leading to conducting a test on a location being as the test location. For example, radii of the three circular tracks of the first test track 341 may be 1 m, 2 m, 3 m, etc., respectively. For example, the test location transmitted by the product to be tested may be separated from the test-board 31 at a distance of 1 m, and be in a direction of rotating clockwise/counter clockwise by 90° from a direction of directly facing the test-board. Of course, the rotational angle may also be 0°, 30°, 60°, 90°, 120°, 150°, 180°, etc. Thus, the actuating device 33 can drive the speech interactive test device 32 to the test location.

When the test type of the product to be tested is speech interaction, the speech interactive test device may synthesize speech on text content after receiving the text content transmitted by the product to be tested and the attribute information of a test case, and play the synthesized voice signal out. For example, the text content transmitted by the product to be tested may be "who is the author of this painting?" or "how's the weather today?". The attribute information may further comprise the play times, and for example, the above text content is played 20 times.

The speech interactive test device may comprise a speech synthesis unit, a speaker and so on. The speech synthesis unit may comprise, but is not limited to, one or more processors or processing units, a system memory, and a bus for connecting different components of system (comprising the system memory and the processing units). One or more processors or processing units of the speech synthesis unit may execute an instruction to synthesize the text of a test case into a human voice. For example, the speech synthesis unit may synthesize the text (e.g., "who is the author of this painting?") of a test case into a human voice conformed to the attribute information of the test case, and play the human voice out by the speaker.

For example, the process of executing step 104 by the product to be tested may be as following: a voice signal played by a test device is received; speech recognition is conducted on the voice signal, to obtain recognized text; the recognized text is compared with the text content, to determine whether the recognized text is correct. Where, in response to the consistency between the recognized text and the text content, it is determined that the recognized text is correct; and in response to the inconsistency between the recognized text and the text content, it is determined that the recognized text is incorrect. For example, the method of determining whether the text is incorrect may comprise, but is not limited to, checking the recognized text based on a preset answer, and analyzing correctness of the test result. For example, if each of the recognized text and the preset answer is "who is the author of this painting?", then it is determined that the recognized text is correct. Assuming that the above test case has played 20 times, a record is made at each time the test case is played. In each playing of the test case, in response to the consistency between the recognized text and the text content, it is determined that the recognized text is correct, and a "right" is marked. In response to the inconsistency between the recognized text and the text content, it is determined that the recognized text is incorrect, and a "wrong" is marked. The product to be tested may also determine the correct rate of speech recognition (e.g., word recognition rate, sentence recognition rate, etc.), the correct rate of semantic recognition, etc., based on counts of "right" and counts of "wrong".

The method according to at least an embodiment of the present disclosure may further comprise following steps: Obtaining a test type of the product to be tested. When the test type of the product to be tested is gesture interaction, the test case is gesture content, and the attribute information of the test case comprises any one or more of moving frequency and gesture amplitude. Thus, the test device conducts a corresponding gesture based on the gesture content and the attribute information of the test case.

Figure 4A:
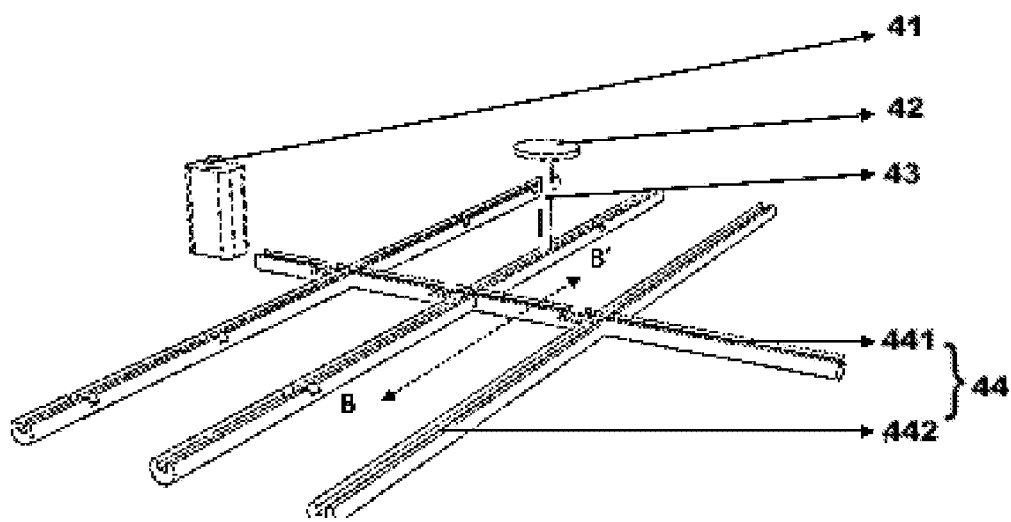
FIG. 4A is a schematic diagram of an interactive test system when the test type of a product to be tested is gesture interaction.
Figure 4B:
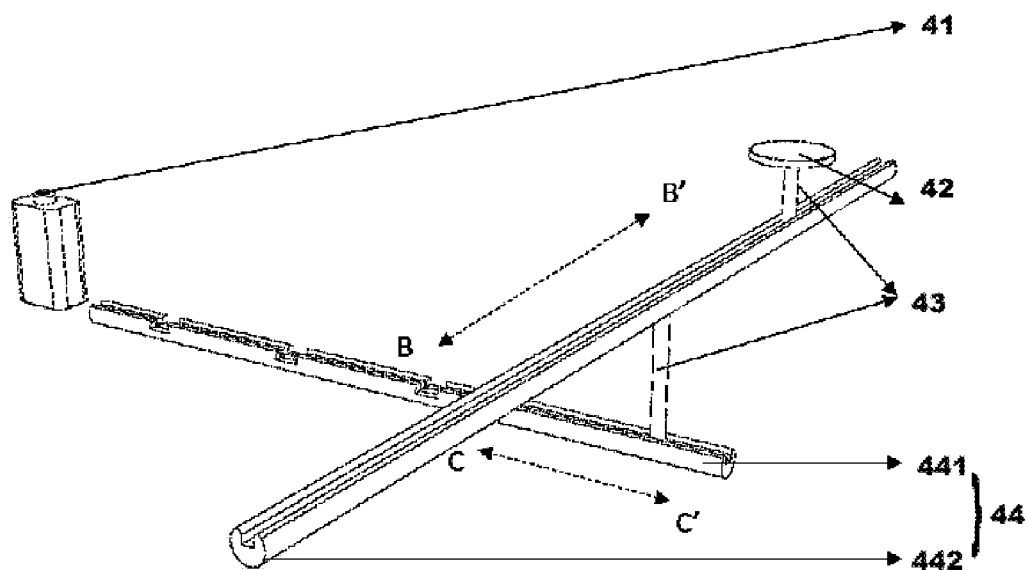
FIG. 4B is a schematic diagram of an interactive test system when the test type of a product to be tested is gesture interaction.

FIG. 4A and FIG. 4B are schematic diagrams of an interactive test system when the test type of a product to be tested is gesture interaction.

As shown in FIG. 4A and FIG. 4B, the interactive test system comprises a test-board 41 for placement of a product to be tested, a gesture interactive test device 42, an actuating device 43, and a test track 44. The test track 44 may comprise the above-described second test track 441 (the second test track 342 in FIG. 3) and a third test track 442. The third test track 442 may coincide with a line tangent to the first test track 341 in FIG. 3 with a point being as tangent point on the first test track 341, that is, the third test track 442 is at a tangent line that is tangent to the first test track 341 at a point (being a tangent point) on it. In FIG. 4, the third test track 442 may comprise three straight-line tracks perpendicular to the second test track, and the second test track 441 is jointed to the three straight-line tracks of the third test track 442. The actuating device may move all around the second test track 442 and the three straight-line tracks of the third test track 442 (for example, in the direction of B-B' in FIG. 4A, or in the direction of C-C' in FIG. 4B), leading to conduct a test on a location being as a test location. For example, the three tracks may be situated from the test-board at distances of 1 m, 2 m, 3 m, etc.

For example, when the test type of a product to be tested is gesture interaction, after receiving gesture content sent by the product to be tested and attribute information of a test case, a gesture interactive test device may make gestures corresponding to gesture content based on the attribute information.

For example, the process of performing step 104 by the product to be tested may be that, at least a gesture image of the test device is captured. Image recognition is performed on the gesture image for obtaining a recognized gesture. The recognized gesture is compared with the gesture content for determining whether the recognized gesture is correct. If the recognized gesture is consistent with the gesture content, then it is determined that the recognized gesture is correct; if the recognized gesture is not consistent with the gesture content, then it is determined that the recognized gesture is wrong.

For example, from the method according to at least an embodiment of the present disclosure, when the test type of the product to be tested is speech interaction and gesture interaction, the test case is text content and gesture content, and the attribute information of the test case comprises any or more of pronunciation, speaking speed, volume, intonation, dialect type, moving frequency, gesture amplitude, etc.

Figure 5:
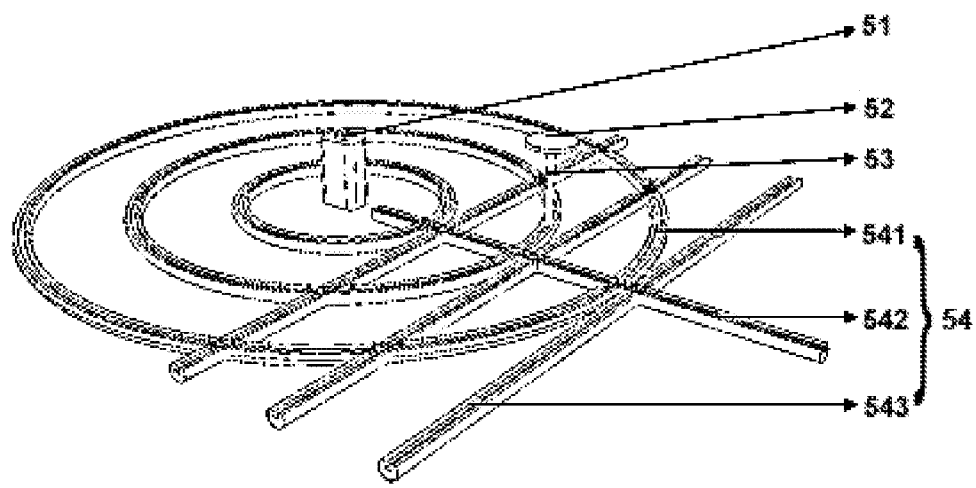
FIG. 5 is another schematic diagram of an interactive test system when the test type of a product to be tested is speech interaction and gesture interaction.

FIG. 5 is another schematic diagram of an interactive test system when the test type of a product to be tested is speech interaction and gesture interaction.

Referring to FIG. 5, the interactive test system according to at least an embodiment of the present disclosure comprises a test-board 51 for placement of a product to be tested, a speech interactive test device and gesture interactive test device 52, an actuating device 53 and a test track 54. The test track 54 comprises a first test track 541, a second test track 542 and a third test track 543. The first test track 541 takes the test-board as the center of a circle. The second test track 542 coincides with a connecting line between the center of the circle and a point outside the first test track 541, that is, the second test track 542 is obtained by connecting the center of the circle to a point outside the first test track 541. The third test track 543 coincides with a line tangent to the first test track 541 with a point on it as tangent point, that is, the third test track 543 may be obtained by making a tangent line at a tangent point on the first test track 541.

Figure 6:
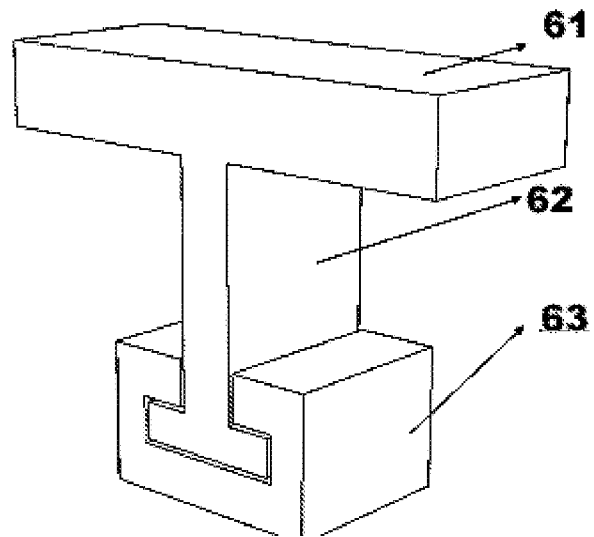
FIG. 6 is a schematic view illustrating the connection between an actuating device, a test track and a test device.

FIG. 6 is a schematic diagram illustrating connection between an actuating device and a test track and a test device.

As shown in FIG. 6, a T-shaped connection is achieved between a test track 63 and an actuating device 62, and the actuating device 62 is fixedly connected to a test device 61.

For example, according to at least an embodiment of the present disclosure, after performing step S104 by a test device, the method according to at least an embodiment of the present disclosure may further comprise following steps: a test report is generated based on the test result. The test report comprises the test result, the test time, the test location, the test case, and the test data, for ease of test staffs to view. The test report may be in Excel version, in Word version, or in PDF version, etc. It is also possible to indicate whether a current test is successful during testing process. For example, through a hint given by an indicator light or displayed directly on a display screen, it is convenient for test staffs to have some ideas of the test situation before having the test report.

For example, according to at least an embodiment of the present disclosure, after performing step S104 by the test device, the method may further comprise the following steps: it is determined whether a current test is successful according to the test result; if the current test is successful, then a first prompting message is transmitted; if the current test is not successful, then a second prompting message is transmitted, which helps test staffs to know the test status in time.

With the interactive test method according to at least an embodiment of the present disclosure, it is possible that by controlling the actuating device and the test device, the test device is driven by the actuating device to a test location, and the test device executes a test case based on the attribute information. Thus, a product to be tested is tested automatically without impacts of accent, speaking speed, gesture amplitude, or the like. It brings enhanced test accuracy, shortened test time, and reduced test cost.

Figure 7:
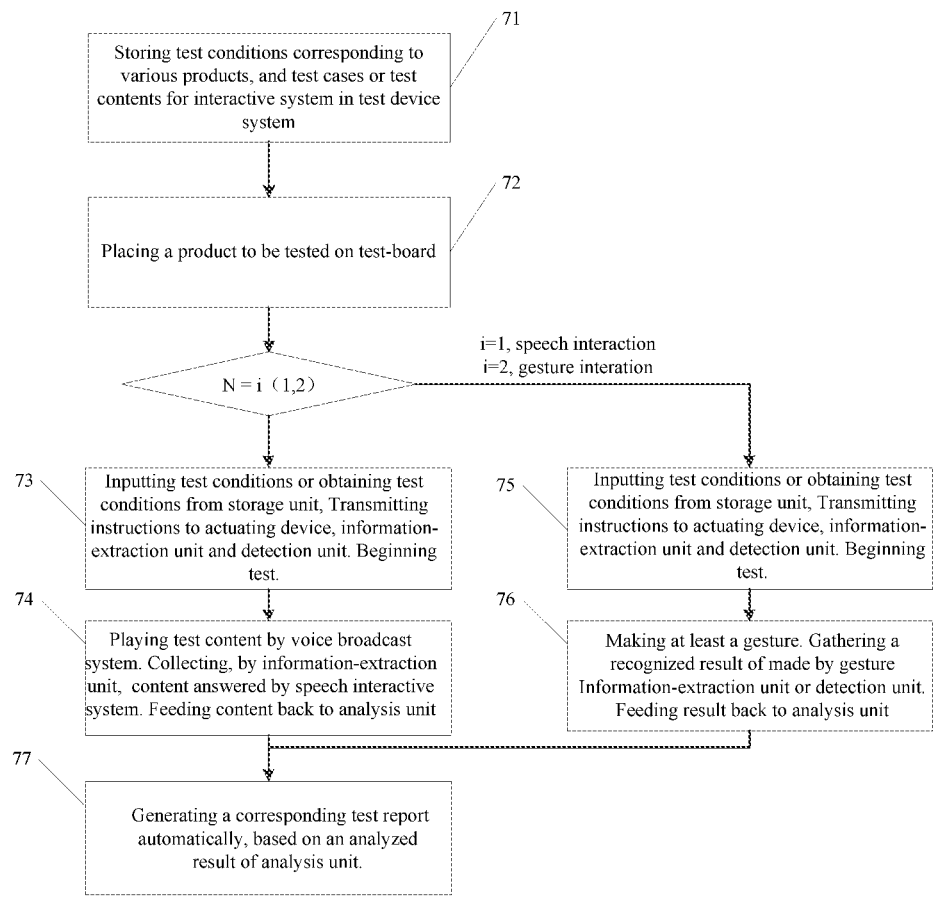
FIG. 7 is another schematic flowchart illustrating an interactive test method provided by at least an embodiment of the present disclosure.

FIG. 7 is a schematic flowchart illustrating an interactive test method provided by at least an embodiment of the present disclosure.

As shown in FIG. 7, the interactive test method provided according to at least an embodiment of the present disclosure may comprise following steps S71 to S77.

Step S71: storing test conditions corresponding to all kinds of products, as well as test cases or test contents for speech interactive system in a test device system.

Step S72: placing a test sample on a test-board. Then, it is determined whether it is a speech interactive test (for example, when i=1, it is determined to be a speech interactive test) or a gesture interactive test (for example, when i=2, it is determined to be a gesture interactive test).

Step S73: if it is a speech interactive test, then test conditions are input or extracted. Instructions are transmitted to an actuating device, an information-extraction unit, and a detection unit. Then a speech interactive test begins. At this time, the actuating device may move a speech interactive test device to a test location, the information-extraction unit is prepared to start extracting a recognized result, while the detection unit is prepared to start testing.

Step S74: the speech interactive test device plays a test content (e.g., "who is the author of this painting?"), and the information-extraction unit collects a content answered by the speech interactive test device (if it is speech recognition, identification of "who is the author of this painting?" is required; if it is semantic recognition, feedback of a semantic recognized content (e.g., an author's name such as "Van Gogh") is required). The information-extraction unit to feed answered content back to an analysis unit.

Step S75: if it is a gesture interactive test, similarly, test conditions are input or extracted. Instructions are transmitted to an actuating device, an information-extraction unit, and a detection unit. Then the gesture interactive test begins. At this time, the actuating device may arrange a gesture interactive test device to the location of a test point. The information-extraction unit is prepared to start extracting a recognized result, while the detection unit is prepared to start testing.

Step S76: with gestures made by the gesture interactive test device, the information-extraction unit or detection unit collects a recognized result of gesture action, and feeds the recognized result back to an analysis unit.

Step S77: based on an analyzed result of the analysis unit, a corresponding test report is automatically generated.

Figure 8:
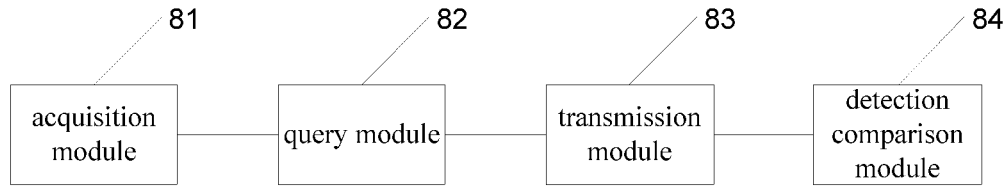
FIG. 8 is a structurally schematic diagram illustrating an interactive test device provided by at least an embodiment of the present disclosure.

FIG. 8 is a structurally schematic diagram illustrating an interactive test device provided by at least an embodiment of the present disclosure.

As shown in FIG. 8, the interactive test device is applicable to a product to be tested that is placed on a test-board, and comprises an acquisition module 81, a query module 82, a transmission module 83 and a detection comparison module 84. These modules may be implemented by hardware, software, firmware or the like. For example, when implemented in software, computer executable instructions comprised in a software module will be executed by a processor, so as to achieve the corresponding functions of acquisition, query, sending, detection and comparison, and so on. The acquisition module 81 may be used to obtain an identification of a product to be tested. The query module 82 may be used to obtain test conditions corresponding to the product to be tested based on the identification. The test conditions may comprise a test type, a test location, a test case and the attribute information of the test case. The transmission module 83 may be used to transmit the test location to an actuating device for driving a test device to the test location by the actuating device. Further, the transmission module 83 may be used to transmit the test case and the attribute information of the test case to the test device for execution of the test case by the test device based on the attribute information. The detection comparison module 84 may be used to obtain the test data transmitted by the test device, and to compare the test data with the test case, thereby obtaining a test result.

Figure 11:
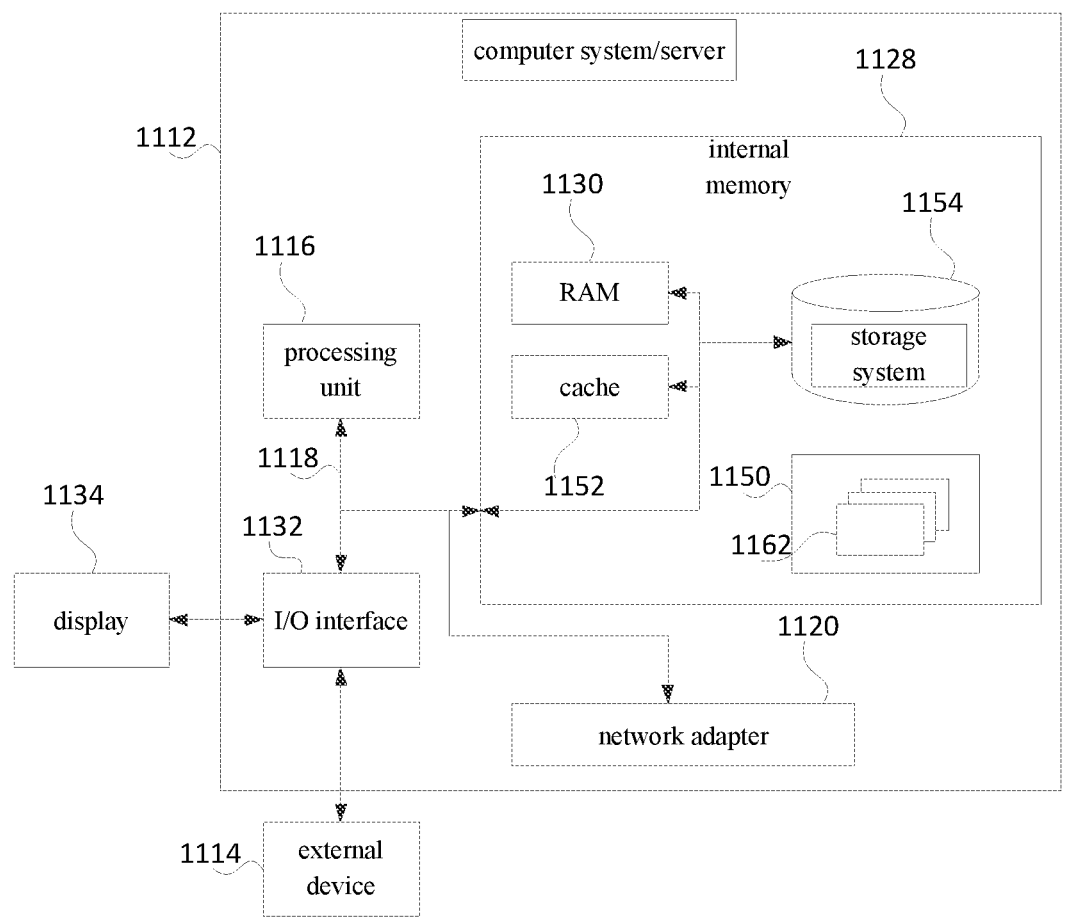
FIG. 11 is a structurally schematic diagram illustrating a computer device provided by at least an embodiment of the present disclosure.

The interactive test device provided by at least an embodiment of the present disclosure may be a product to be tested, or a software installed on the product to be tested. Referring to FIG. 11, the interactive test device may have programs/utilities 1150 of a group of (at least one) program modules 1162, and the programs/utilities 1150 of the group of program modules 1162 may be stored in, for example, an internal memory 1128. The program module 1162 comprises, but is not limited to, an operating system, one or more application programs, other program modules, and program data, and each or some combination of these examples may comprise the implementation in network environment. Program module 1162 generally performs functions and/or methods in embodiments described in this application.

In at least an embodiment of the present disclosure, test conditions corresponding to a product to be tested may be pre-stored in a product to be tested (e.g. the internal memory 1128 in FIG. 11), so that the product to be tested can obtain the test conditions directly from memories (e.g. internal memory 1128 in FIG. 11) or the like. In at least an embodiment of the present disclosure, test conditions may be used for conducting tests of a product to be tested. For example, when the product to be tested is a product of speech interaction, the test conditions are used to test the accuracy of speech recognition, ability of obtaining voice signal or the like for the product of speech interaction. Where, the test location may comprise a test distance and a test angle. The test case may be text content, a voice signal, gesture content, etc. The attribute information of the test case may be, for example, pronunciation, speaking speed, volume, intonation, dialect type, gesture moving frequency, gesture amplitude, etc.

In at least an embodiment of the present disclosure, the product to be tested may be applicable to an interactive test system, which may comprise a test-board for placement of the product to be tested, an actuating device, and a test device fixedly connected to the actuating device. The actuating device, which is coupled to the product to be tested, is used to move to a test location according to an instruction of the product to be tested. The test device, which is coupled to the product to be tested, is used to execute a corresponding test case based on the attribute information according to an instruction of the product to be tested. The product to be tested can perform the interactive test method shown in FIG. 1. The actuating device may be a robot or other device that can move automatically, or a mobile device that can move in conjunction with a test track, or the like.

When the actuating device coordinates with the test track to move a test device, the schematic diagram of an interactive test system may, as shown in FIG. 2, comprise a test-board for placement of a product 21 to be tested, a test track 22, an actuating device 23 placed on the test track 22 and a test device 24 fixedly connected to the actuating device 23. The actuating device 23, which is coupled to the product 21 to be tested, is used to move to a test location along the test track according to an instruction of the product to be tested. The test device 24, which is coupled to the product 21 to be tested, is used to execute a corresponding test case based on the attribute information according to an instruction of the product to be tested. The product 21 to be tested is used to obtain the test data transmitted by the test device, and to compare the test data with the test case, thereby obtaining a test result.

In at least an embodiment of the present disclosure, after transmission of a test location by a product to be tested to an actuating device, the actuating device may move to the test location along a test track, for taking a test device fixed to the actuating device to move to the test location. After the actuating device has moved to the test location, the actuating device may transmit a response message to the product to be tested. After receiving the response message, the product to be tested transmits a test case and attribute information of the test case to the test device, and the test device executes the test case based on the attribute information.

For example, on the basis of the above embodiment, the query module 82 may further be used to obtain test type of the product to be tested. When the test type of the product to be tested is speech interaction, the test case may be text content, and the attribute information of the test case may comprise any or more of pronunciation, speaking speed, volume, intonation, dialect type, so that the test device synthesize speech on the text content based on the attribute information of the test case, and play the synthesized voice signal out. Accordingly, the detection comparison module 84 may be used to receive the voice signal played by the test device and to conduct speech recognition on the voice signal, thereby obtaining recognized text. The detection comparison module 84 may further be used to compare the recognized text with a test case, thereby determining whether the recognized text is correct. If the recognized text is consistent with the text content, then it is determined that the recognized text is correct; if the recognized text is inconsistent with the text content, then it is determined that the recognized text is incorrect.

For example, on the basis of the above embodiment, when the test type of the product to be tested is gesture interaction, the test case is gesture content, and the attribute information of the test case comprises any or more of the following information: moving frequency, gesture amplitude, so that the test device makes a corresponding gesture based on the gesture content and the attribute information of the test case. Correspondingly, the detection comparison module 84 may be used to capture at least one gesture image of a test device and to perform an image recognition on the gesture image, thereby obtaining a recognized gesture. The detection comparison module 84 may be further used to compare the recognized gesture with gesture content, thereby determining whether the recognized gesture is correct. If the recognized gesture is consistent with the gesture content, then it is determined that the recognized gesture is correct; if the recognized gesture is not consistent with the gesture content, then it is determined that the recognized text is incorrect.

For example, on the basis of the above embodiment, when the test type of the product to be tested is speech interaction and gesture interaction, the test case is text content and gesture content, and the attribute information of the test case may comprise any or more of pronunciation, speaking speed, volume, intonation, dialect type, moving frequency, gesture amplitude.

Figure 9:
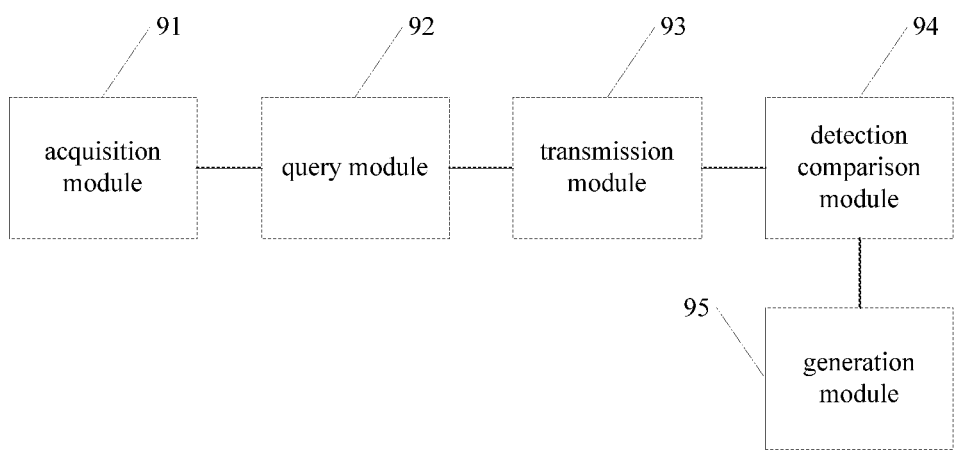
FIG. 9 is another structurally schematic diagram illustrating an interactive test device provided by at least an embodiment of the present disclosure.

For example, referring to FIG. 9, a device according to at least an embodiment of the present disclosure may further comprise a generation module 95, for generating a test report based on the test result. The test report comprises the test result, the test time, the test location, the test case and the test data, for ease of test staffs to view.

Figure 10:
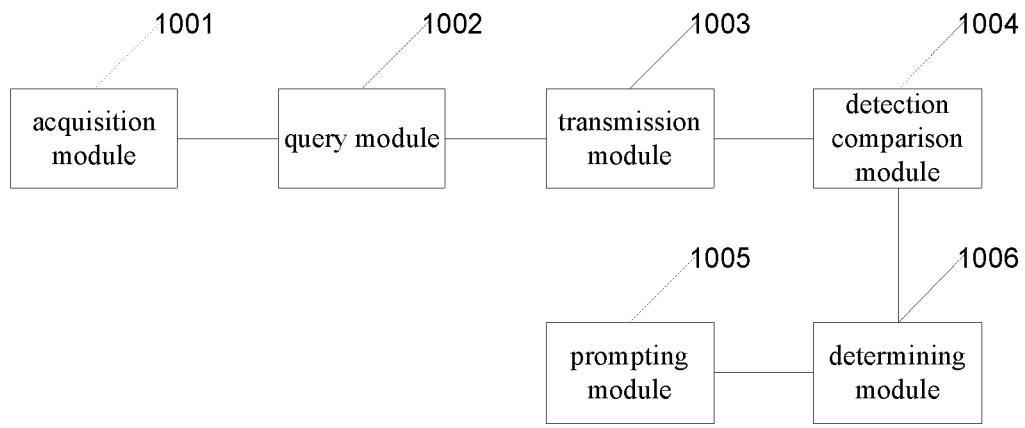
FIG. 10 is still another structurally schematic diagram illustrating an interactive test device provided by at least an embodiment of the present disclosure.

For example, referring to FIG. 10, a device according to at least an embodiment of the present disclosure may further comprise a determining module 1006 and a prompting module 1005. The determining module 1006 may be used to determine whether a current test is successful based on the test result. The prompting module 1005 may be used to transmit a first prompt message when the current test is successful and to transmit a second prompt message when the current test is not successful, so that test staffs would know the test situation in time.

The generation module 95, the determining module 1006, the prompting module 1005 or the like as mentioned above may also be implemented by means of hardware, software, or firmware, etc. For example, when they are implemented in software, computer executable instructions comprised in a software module will be executed by a processor, for realizing the corresponding functions of generation, determination, prompt and so on.

With an interactive test device according to at least an embodiment of the present disclosure, an identification of a product to be tested is obtained; according to the identification, test conditions corresponding to the product to be tested are obtained. Test conditions comprises a test type, a test location, a test case and attribute information of the test case. The test location is transmitted to an actuating device, so that the test device is driven to the test location by the actuating device. The test case and the attribute information of the test case are transmitted to the test device, so that the test case is executed by test device based on the attribute information. The test data transmitted by the test device is obtained, and is compared with the test case to obtain a test result. Thus, it is possible that by controlling the actuating device and the test device, the test device is driven by the actuating device to the test location, and a test case is executed by the test device based on the attribute information. Thus, a product to be tested is tested automatically without impacts of accent, speaking speed, gesture amplitude or the like. It brings enhanced test accuracy, shortened test time, and reduced test cost.

According to the present disclosure, there is also provided an interactive test system, comprising a test-board for placement of a product to be tested, an actuating device, and a test device fixedly connected to the actuating device. The actuating device is coupled to the product to be tested, for moving to a test location according to an instruction of the product to be tested. The test device is coupled to the product to be tested, for executing a corresponding test case based on the attribute information according to an instruction of the product to be tested. The product to be tested is useful for performing the interactive test method shown in FIG. 1. Where, the actuating device may be a robot or other equipment that can move automatically, or a mobile device that can move in conjunction with a test track.

When the actuating device is a mobile device that needs to work in with a test track to move, the schematic diagram of an interactive test system may, as shown in FIG. 2 to FIG.

6, comprise a test-board for placement of a product to be tested, a test track, an actuating device placed on the test track and a test device fixedly connected to the actuating device. The actuating device is coupled to the product to be tested, for moving to a test location along the test track according to an instruction of the product to be tested. The test device is coupled to the product to be tested, for executing a corresponding test case based on the attribute information according to an instruction of the product to be tested. The product to be tested is used to perform the interactive test method shown in FIG. 1.

For example, the test type of a product to be tested according to an embodiment of the present disclosure may be speech interaction and/or gesture interaction. The test device is a speech interactive test device and/or a gesture interactive test device. When the test type of the product to be tested is speech interaction, the test device is a speech interactive test device. The test track comprises a second test track with a test-board as the center of a circle, and a first test track obtained by connecting the center of the circle to a point outside the second test track.

For example, according to at least an embodiment of the present disclosure, when the test type of the product to be tested is gesture interaction, the test device is a gesture interactive test device. The test track comprises a second test track with a test-board as the center of a circle and a third test track; which is a line tangent to the second test track with one point on it as tangent point.

With the interactive test system according to at least an embodiment of the present disclosure, it is possible that by controlling the actuating device and the test device, the test device is driven by the actuating device to a test location, and the test device executes a test case based on the attribute information. Thus, a product to be tested is tested automatically without impacts of accent, speaking speed, gesture amplitude or the like. It brings enhanced test accuracy, shortened test time, and reduced test cost.

According to the present disclosure, there is also provided an interactive test device, which comprises a memory, a processor and a computer program stored on the memory and capable of running on the processor. The interactive test method described above is implemented when the processor executes the above program.

FIG. 11 is a block diagram illustrating an exemplary computer equipment suitable for implementing embodiments of the present application. The computer system/server 1112 shown in FIG. 11 is merely an example, and shall not bring any restriction to functionalities and scope of embodiments of the present application.

As shown in FIG. 11, the computer system/server 1112 behaves in the form of a general-purpose computing devices. Components of the computer system/server 1112 may comprise, but are not limited to, one or more processors or processing units 1116, an internal memory 1128, and a bus 1118 that connects different components of system (comprising the internal memory 1128 and processing units 1116).

The bus 1118 represents one or more of several types of bus structures, comprising a memory bus or memory controller, a peripheral bus, an accelerated graphics port, a processor, or a local bus adopting any bus structure of a variety of bus structures. For example, these architectures comprise, but are not limited to, an Industry Standard Architecture (hereinafter briefly called as ISA) bus, a Micro Channel Architecture (hereinafter briefly called as MAC) bus, an enhanced ISA bus, a Video Electronics Standards Association (hereinafter briefly called as VESA) local bus and a Peripheral Component Interconnect (hereinafter briefly called as PCI) bus.

The computer system/server 1112 typically comprises a variety of computer system readable media. These media may be any media accessible by the computer system/server 1112, comprising volatile and non-volatile media, movable and immovable media.

The internal memory 1128 may comprise a computer system readable medium in the form of volatile memory, such as a Random Access Memory (hereinafter briefly called as RAM) 1130 and/or a cache memory 1152. The computer system/server 1112 may further comprise other movable/immovable, volatile/non-volatile computer system storage medium. As an example only, the storage system 1154 may be used for read and write on an immovable, non-volatile magnetic medium (not shown in FIG. 11, and commonly called as a "hard disk drive"). Although not shown in FIG. 11, it is possible to provide a magnetic disk drive for read and write on removable, non-volatile magnetic disks (such as "floppy disks"), and an optical disk driver for read and write on movable, non-volatile optical disks (e.g., Compact Disc Read Only Memories, which is briefly called as CD-ROMs hereinafter), digital versatile disk read-only memories (Digital Video Disc Read Only Memories; hereinafter briefly called as DVD-ROMs) or other optical media. In these cases, each of the drives may be connected to the bus 1118 through one or more data medium interfaces. The internal memory 1128 may comprise at least one program product having a group of (for example, at least one) program modules, and these program modules are configured to perform the functions of each embodiment of the present application.

The computer system/server 1112 may also communicate with one or more external devices 1114 (such as a keyboard, a pointing equipment, a display 1134, etc.), and may also communicate with one or more devices that enable a user to interact with the computer system/server 1112, and/or communicate with any devices (such as a network card, modem, etc.) that enable the computer system/server 1112 to communicate with one or more other computing devices. Said communication may be carried out through an input/output (I/O) interface 1132. Furthermore, computer system/server 1112 may also communicate with one or more networks (such as a Local Area Network; hereinafter briefly called as LAN), a Wide Area Network (Hereinafter briefly called as WAN) and/or a public network (such as the Internet)) through a network adapter 1120. As shown in the figure, the network adapter 1120 communicates with other modules of the computer system/server 1112 via the bus 1118. It should be understood that, although not shown in figures, other hardware and/or software modules may be used in conjunction with the computer system/server 1112, which comprises, but not limits to, a microcode, an equipment drive, a redundant processing unit, an external magnetic disk drive array, a RAID system, a tape drive and a data backup storage system, etc.

The processing unit 1116 performs various functional applications and data processing by running programs stored in the internal memory 1128, for implementation of methods mentioned in aforesaid embodiments.

Present disclosure also provides a non-volatile, computer-readable storage medium, on which a computer program is stored, and interactive test methods described above are implemented when the program is executed by a processor.

Present disclosure also provides a computer program product, and interactive test methods described above are implemented when instructions in the computer program product are executed by a processor.

In the description of present specification, the description referring to the terms "an embodiment", "some embodiments", "an examples", "examples," or "some examples" and the like means that a feature, structure, material, or characteristic described in connection with the embodiment or example is comprised in at least one embodiment or example of the present disclosure. In present specification, the schematic representation of the above-mentioned terms does not necessarily refer to the same embodiment or example. Moreover, the described features, structures, materials, or characteristics may be combined in any one or more embodiments or examples in a suitable manner. In addition, those skilled in the art can combine or re-organize different embodiments or examples described in present specification or features of different embodiments or examples without contradicting each other.

Furthermore, the terms of "first", "second", or the like are used for descriptive purposes only, which could not be understood as indicating or implying relative importance or implicitly indicating the number of technical features indicated. Thus, features limited by "first", "second" or the like may explicitly or implicitly comprise at least one of the features. In the description of the present disclosure, the meaning of "plural" is at least two, such as two, three, etc., unless otherwise specifically defined.

Any process or method in the flowchart or otherwise described herein can be understood as representing a module, segment, or portion of code comprising one or more executable instructions for implementing customized logical functions or steps of the process. The scope of preferred embodiments of the present disclosure comprise additional implementations in which functions may be performed in a substantially simultaneous manner or in reverse order, other than in the order shown or discussed, as should be understood by those skilled in the art to which embodiments of the present disclosure belong.

The logic and/or steps represented in the flowchart or otherwise described herein, for example, may be considered as a fixed sequence table of executable instructions for implementing logical functions. Those logic and/or steps may be implemented in any computer readable medium for use by or in connection with an instruction execution system, apparatus, or device (e.g., a computer-based system, a system comprising a processor, or other system that can fetch and execute instructions from the instruction execution system, apparatus, or device). For the purposes of present specification, "computer readable medium" may be any device that can contain, store, communicate, propagate, or transport the program for use by or in connection with the instruction execution system, apparatus, or device. Examples (non-exhaustive list) of computer readable media comprises an electrical connection (electronic device) having one or more wires, a portable computer disk cartridge (magnetic device), a random access memory (RAM), a read-only memory (ROM), an erasable editable read-only memory (EPROM or flash memory), an optical fiber device, and a portable optical disk read-only memory (CDROM). In addition, the computer readable medium may even be paper or other suitable medium on which the program can be printed. Because the program can be electronically obtained, for example, by optically scanning the paper or other medium, followed by editing, interpreting, or processing in other suitable ways if necessary, and then to be stored in a computer memory.

It should be understood that portions of the present disclosure may be implemented in hardware, software, firmware, or a combination thereof. In the above embodiments, the plurality of steps or methods may be implemented in software or firmware stored in a memory and executed by a suitable instruction execution system. For example, if implemented in hardware as in another embodiment, it can be implemented by any one or a combination of the following technologies known in the art: discrete logic circuits having logic gates for implementing logic functions on data signals, application specific integrated circuits having appropriate combinational logic gates, programmable gate arrays (PGA), field programmable gate arrays (FPGA), etc.

Ordinaries skilled in the art can understand that all or part of the steps carried by the method for implementing the above embodiment can be completed by instructing relevant hardware through a program, which can be stored in a computer readable storage medium, and the program, when executed, comprises one or a combination of the steps of the method embodiment.

In addition, each functional unit in each embodiment of the present disclosure may be integrated into one processing module, and each unit may exist physically separately, or two or more units may be integrated into one module. The above-mentioned integrated modules can be implemented either in the form of hardware or in the form of software functional modules. If the integrated module is implemented in the form of a software functional module and sold or used as an independent product, it may also be stored in a computer readable storage medium.

The storage medium mentioned above may be read-only memory, magnetic disk or optical disk, etc. Although embodiments of the present disclosure have been shown and described above, it is to be understood that the above-mentioned embodiments are exemplary and should not be construed as limiting the present disclosure, and ordinaries skilled in the art may make changes, modifications, substitutions and variations to the above-mentioned embodiments within the scope of the present disclosure.

What is claimed is:

1. An interactive test method, applicable to a product to be tested, comprising:

obtaining an identification of the product to be tested;

obtaining test conditions corresponding to the product to be tested according to the identification, wherein the test conditions comprise a test type, a test location, a test case and attribute information of the test case, wherein a test track comprises: a first test track with a test-board as a center of a circle; and a second test track, coinciding with a connecting line between the center of the circle and a point outside the first test track; and in a case where the test type of the product to be tested is speech interaction, the test case is text content, and the attribute information of the test case comprises any one or more of pronunciation, speaking speed, volume, intonation and dialect type;

transmitting a first instruction comprising the test location to an actuating device, so that the actuating device moves to the test position and takes a testing device to move to the test location;

in response to moving the testing device to the test location, transmitting a second instruction comprising the test case and the attribute information of the test case to the test device, so that the test case is executed according to the attribute information of the test case; and obtaining test data transmitted by the test device and obtained by performing a test according to the first instruction and the second instruction, and comparing the test data with the test case to obtain a test result,
wherein the obtaining the test data transmitted by the test device and comparing the test data with the test case to obtain the test result comprise:
receiving a voice signal played by the test device;
conducting speech recognition on the voice signal, to obtain recognized text; and
comparing the recognized text with the text content, to determine whether the recognized text is correct.

2. The method according to claim 1, further comprising obtaining the test type of the product to be tested, wherein
in a case where the test type of the product to be tested is gesture interaction, the test case is gesture content, and the attribute information of the test case comprises any one or more of moving frequency and gesture amplitude;
the obtaining the test data transmitted by the test device, and comparing the test data with the test case to obtain the test result comprises
obtaining at least one gesture image of the test device;
conducting image recognition on the gesture image, to obtain a recognized gesture; and
comparing the recognized gesture with the gesture content, to determine whether the recognized gesture is correct.

3. The method according to claim 1, after obtaining the test data transmitted by the test device and comparing between the test data and the test case to obtain the test result, further comprising:
generating a test report based on the test result, wherein the test report comprises the test result, test time, the test location, the test case, and the test data.

4. The method according to claim 1, after obtaining the test data transmitted by the test device and comparing between the test data and the test case to obtain the test result, further comprising:
determining whether a current test is successful based on the test result;
transmitting a first prompt message in response to success of the current test; and
transmitting a second prompt message in response to failure of the current test.

5. An interactive test system, comprising a test track, an actuating device and a test device, wherein:
the test track comprises: a first test track with a test-board as a center of a circle; and a second test track, coinciding with a connecting line between the center of the circle and a point outside the first test track;
the actuating device, is mounted on the test track and is configured for moving to a test location along the test track and taking a testing device to move to the test location according to a first instruction, which comprises a test location of a product to be tested; and
the test device, is configured for executing a test case at the test location, based on attribute information of the test case according to a second instruction, which comprises the test case of the product to be tested and the attribute information of the test case,
wherein the executing the test case by the test device based on the attribute information further comprises:
synthesizing speech on the test case based on the attribute information of the test case, in a case where the test type of the product to be tested is speech interaction; and
playing the synthesized voice signal,
wherein the test case is text content, and the attribute information of the test case comprises any one or more of pronunciation, speaking speed, volume, intonation, dialect type;
obtaining the test data transmitted by the test device and comparing the test data with the test case to obtain the test result comprise:
receiving the synthesized voice signal by the test device;
conducting speech recognition on the synthesized voice signal, to obtain recognized text; and
comparing the recognized text with the text content, to determine whether the recognized text is correct.

6. The interactive test system according to claim 5, further comprising a test-board for placement of the product to be tested, wherein the product to be tested is configured to:
obtain an identification of the product to be tested;
obtain test conditions corresponding to the product to be tested according to the identification, wherein the test conditions comprise a test type, a test location, a test case and attribute information of the test case;
transmit a first instruction comprising the test location to an actuating device;
transmit a second instruction comprising the test case and the attribute information of the test case to the test device; and
obtain test data transmitted by the test device, and compare the test data with the test case to obtain a test result.

7. The interactive test system according to claim 5, wherein
the actuating device is configured to obtain the test location from the product to be tested, and drive the test device to the test location;
the test device is configured to:
obtain the test case of the product to be tested and the attribute information of the test case from the product to be tested;
execute the test case based on the attribute information; and
transmit the test data to the product to be tested.

8. The interactive test system according to claim 7, wherein
the executing the test case by the test device based on the attribute information further comprises:
synthesizing a corresponding gesture for the test case based on the attribute information of the test case, in a case where the test type of the product to be tested is gesture interaction; and
the transmitting the test data to the product to be tested by the test device further comprises:
making the synthesized gesture,
wherein the test case is gesture content, and the attribute information of the test case comprises any one or more of moving frequency and gesture amplitude.

9. The system according to claim 5, wherein the actuating device is mounted on the test track and configured for moving to the test location along the test track according to an instruction of the product to be tested.

10. The system according to claim 5, wherein the test track further comprises:
a third test track, coinciding with a line tangent to the first test track with a point on the first test track as tangent point.

11. An interactive test device, comprising:
a memory,
a processor, and a computer program stored on the memory and capable of causing the processor to execute the interactive test method according to claim 1 when the program is executed by the processor.

12. A non-transitory computer readable storage medium, on which a computer program is stored, and, when executed by a processor, causes the processor to execute the interactive test method according to claim 1.

* * * * *